(12) United States Patent
Goldberg

(10) Patent No.: US 7,486,637 B2
(45) Date of Patent: Feb. 3, 2009

(54) WIRELESS COMMUNICATION METHOD AND SYSTEM FOR EFFICIENTLY MANAGING PAGING WINDOWS AND DATA MESSAGES

(75) Inventor: Steven Jeffrey Goldberg, Downingtown, PA (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

(21) Appl. No.: 10/325,794

(22) Filed: Dec. 19, 2002

(65) Prior Publication Data

US 2004/0063442 A1    Apr. 1, 2004

Related U.S. Application Data

(60) Provisional application No. 60/413,954, filed on Sep. 26, 2002.

(51) Int. Cl.
*H04Q 7/20* (2006.01)
(52) U.S. Cl. .................. 370/329; 370/461; 710/107
(58) Field of Classification Search ................. 455/458, 455/517, 518, 519; 370/329, 336, 337, 338, 370/349, 461; 710/107
See application file for complete search history.

(56) References Cited

U.S. PATENT DOCUMENTS

| 5,319,699 | A | | 6/1994 | Kerihuel et al. |
| 5,381,464 | A | | 1/1995 | O'Keefe et al. |
| 5,440,299 | A | | 8/1995 | Schwendeman et al. |
| 5,610,904 | A | | 3/1997 | Eng et al. |
| 5,870,388 | A | * | 2/1999 | Yung et al. .................. 370/260 |
| 5,960,325 | A | | 9/1999 | Graham et al. |
| 5,978,366 | A | | 11/1999 | Massingill et al. |
| 6,044,069 | A | | 3/2000 | Wan |
| 6,122,483 | A | * | 9/2000 | Lo et al. .................. 455/12.1 |

(Continued)

FOREIGN PATENT DOCUMENTS

EP    0 928 119    7/1999

(Continued)

OTHER PUBLICATIONS

"3rd Generation Partners; Technical Specification Group Radio Access Network; Introduction of the Multimedia Broadcast Multicast Service (MBMS) in the Radio Access Network (Stage 2); (Release 6)", 3GPP TS 25.346, V 1.1.0, Draft Technical Report (May 2002).

*Primary Examiner*—William D Cumming
(74) *Attorney, Agent, or Firm*—Volpe and Koenig PC

(57) ABSTRACT

A wireless communication method and system for efficiently managing paging windows and data messages. The wireless communication system includes at last one network and a plurality of user equipments (UEs). The network maintains a memory that lists UE group identifiers, UE members associated with the UE group identifiers, and paging windows that define time periods during which UEs in particular UE groups are powered up to access data messages. The network schedules UE group identifiers and associated data message pointers within multiple paging windows listed in the network memory such that each UE accesses only one paging window. The network determines whether more than one paging window is necessary for each particular UE, and whether there are any scheduling conflicts between data messages for a particular UE. If there are no conflicts, the UEs are notified of their assigned paging window(s). Otherwise, data messages are rescheduled as necessary.

12 Claims, 3 Drawing Sheets

U.S. PATENT DOCUMENTS

| | | |
|---|---|---|
| 6,307,846 B1 * | 10/2001 | Willey .................. 370/329 |
| 6,438,375 B1 | 8/2002 | Muller |
| 6,480,504 B1 | 11/2002 | Wang et al. |
| 6,512,935 B1 | 1/2003 | Redi |
| 6,804,528 B1 | 10/2004 | Laroia et al. |
| 6,804,532 B1 | 10/2004 | Moon et al. |
| 2003/0012176 A1 | 1/2003 | Kondylis et al. |
| 2003/0118014 A1 | 6/2003 | Iyer et al. |
| 2003/0214921 A1 | 11/2003 | Alapuranen et al. |
| 2004/0008679 A1 * | 1/2004 | Sinnarajah et al. ......... 370/390 |
| 2004/0063451 A1 | 4/2004 | Bonta et al. |
| 2004/0203872 A1 | 10/2004 | Bajikar |

FOREIGN PATENT DOCUMENTS

| | | |
|---|---|---|
| EP | 0 896 489 | 10/1999 |
| EP | 1 213 939 | 6/2002 |
| EP | 1 213 939 A1 | 6/2002 |
| JP | 08-033008 | 2/1996 |
| KR | 2002-0034977 | 5/2002 |
| TW | 493356 | 1/2002 |
| TW | 2004147801 | 1/2004 |
| WO | 91/03037 | 3/1991 |
| WO | 01/31847 | 5/2001 |
| WO | 01/41490 | 6/2001 |

* cited by examiner

WIRELESS COMMUNICATION METHOD AND SYSTEM FOR EFFICIENTLY MANAGING PAGING WINDOWS AND DATA MESSAGES

CROSS REFERENCE TO RELATED APPLICATION(S)

This application claims priority from U.S. Provisional Patent Application No. 60/413,954, filed Sep. 26, 2002, which is incorporated by reference as if fully set forth.

FIELD OF INVENTION

The present invention generally relates to efficient message transmission in cellular systems. More particularly, the present invention is related to efficient transmission of multicast and broadcast services to user equipment to conserve radio resources and extend battery life.

BACKGROUND

Third generation (3G) cellular systems are continually being modified to improve the efficiency of transmission of multicast and broadcast services to user equipment (UE). There are various parameters that are desirable to optimize in these cellular systems and networks. Typically, when one of the parameters is optimized, the optimum for another parameter is sacrificed. One of the opposing sets of parameters comprises UE power consumption versus radio resource utilization.

For minimum power consumption, UEs should actively search for signals as infrequently as possible. As shown in FIG. 1, when a UE is not searching for the paging window K or being used by the user for some purpose, it should preferably be in a sleep-mode to minimize power consumption.

Additionally, for efficient radio resource utilization, the same message targeted to multiple UEs should ideally be sent only once. For example, referring to FIG. 2, a plurality of UEs 12, 14, 16 are shown. The UEs 12, 14, 16 are associated with a single group XYZ, which is identified by a single group identifier $ID_{XYZ}$. The terminology "group identifier" as used hereinafter may refer to a group, a service or any other type of signal that may be associated with one or more recipients or services. The UEs are notified that the group identifier $ID_{XYZ}$ will be transmitted within a certain paging window, for example paging window K shown in FIG. 1. All the UEs targeted for the transmission will then receive that single transmission of $ID_{XYZ}$ in paging window K.

An important consideration is how to satisfy opposing requirements of both the UE power consumption and radio resource utilization to an acceptable degree. It is desirable to optimize both UE power consumption and radio resource utilization so that the sacrifice in each is within an acceptable range.

To satisfy the UE power requirements, the system can transmit multiple message notifications within a synchronized time period. Each broadcast service or message, or target group for a service is assigned an identifier. The UE can search for the identifier to know that a message it should receive is being transmitted. If the UE does not detect the appropriate identifier within a certain time period, the UE can go into a sleep-mode until the next cycle of the time period occurs.

Prior methods of message transmission in cellular systems have had disadvantages which resulted in loss of UE battery life. Although a desirable approach would be to put the group identifiers for all of the different services expected by UE in the same time window, this approach requires that the UE must look for two or more identifiers, which are likely made up of different groups of UEs. While it may be possible to coordinate some of the recipients into the same search window, the majority will often still require multiple windows.

For example, as shown in FIG. 3, a UE may be associated with several groups. As shown in Table 1 below, UE22 is associated with all three groups: ABC, DEF and GHI. Referring to FIG. 4, since $ID_{ABC}$ is transmitted in paging window K, $ID_{DEF}$ is transmitted in paging window L and $ID_{GHI}$ is transmitted in paging window M, UE22 will have to be in a waking mode during paging windows K, L and M for each possible message identification. Likewise, UE34 will have to be in a waking mode during paging windows L and M. Accordingly, the number of group services a UE is enabled to receive will therefore dictate the number of awake-periods. This will multiply the battery consumption rate by the number of awake-periods.

TABLE 1

| GROUP | GROUP ID | MEMBERS | WINDOW |
|---|---|---|---|
| ABC | $ID_{ABC}$ | UE22, UE24, UE26 | K |
| DEF | $ID_{DEF}$ | UE22, UE34, UE36 | L |
| GHI | $ID_{GHI}$ | UE22, UE34, UE46 | M |

It would be desirable to provide a method for enabling multicast services and UE battery savings without the shortcomings of the prior art.

SUMMARY

The present invention is related to a wireless communication method and system for efficiently managing paging windows and data messages. The wireless communication system includes at last one network and a plurality of UEs. The network maintains a memory that lists UE group identifiers, UE members associated with the UE group identifiers, and paging windows that define time periods during which UEs in particular UE groups are powered up to access data messages. The network schedules UE group identifiers and associated data message pointers within multiple paging windows listed in the network memory such that each UE accesses only one paging window. If the network determines that it is necessary, the network schedules an additional paging window for particular UEs. The network determines whether more than one paging window is necessary for each particular UE, and whether there are any scheduling conflicts between data messages for a particular UE. If there are no conflicts, the UEs are notified of their assigned paging window(s). Otherwise, data messages are rescheduled as necessary.

BRIEF DESCRIPTION OF THE DRAWINGS

A more detailed understanding of the invention may be had from the following description of a preferred embodiment, given by way of example and to be understood in conjunction with the accompanying drawings.

DETAILED DESCRIPTION OF THE PREFERRED EMBODIMENT(S)

Figure 1:
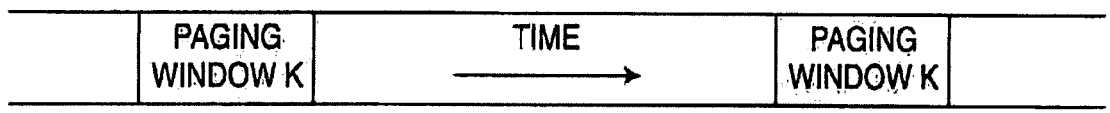
FIG. 1 is a prior art signal diagram of repeating paging.
Figure 2:
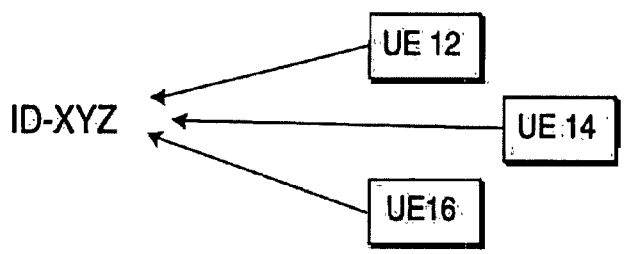
FIG. 2 is a prior art block diagram of a single identifier for multiple UEs.
Figure 3:
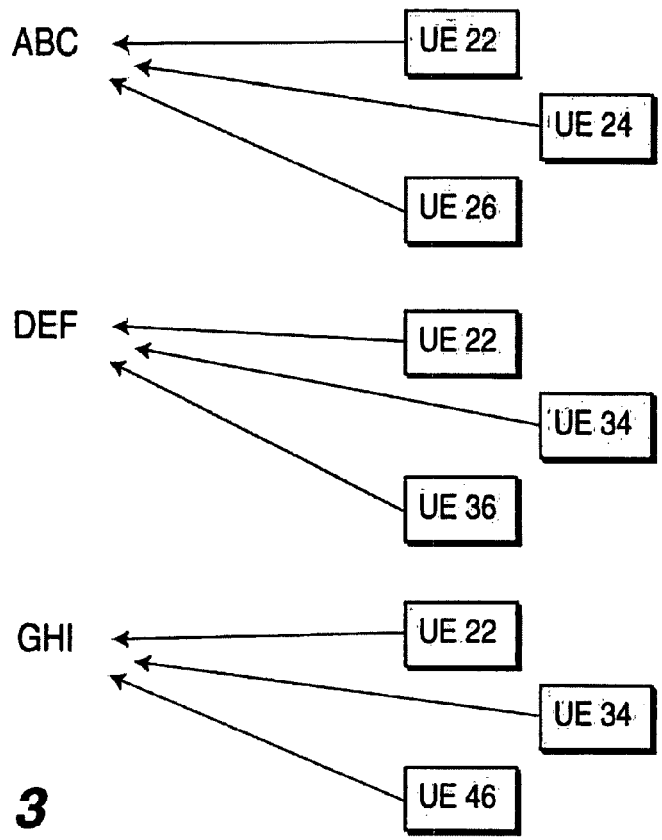
FIG. 3 is a prior art block diagram of multiple identifiers, each having multiple UEs.
Figure 4:
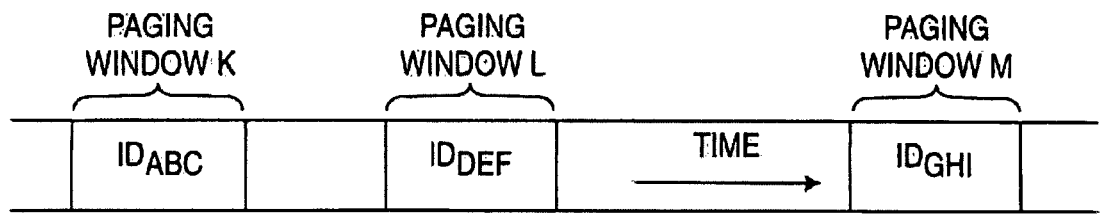
FIG. 4 is a prior art signal diagram of several identifiers and associated pointers transmitted in several paging windows.
Figure 5:
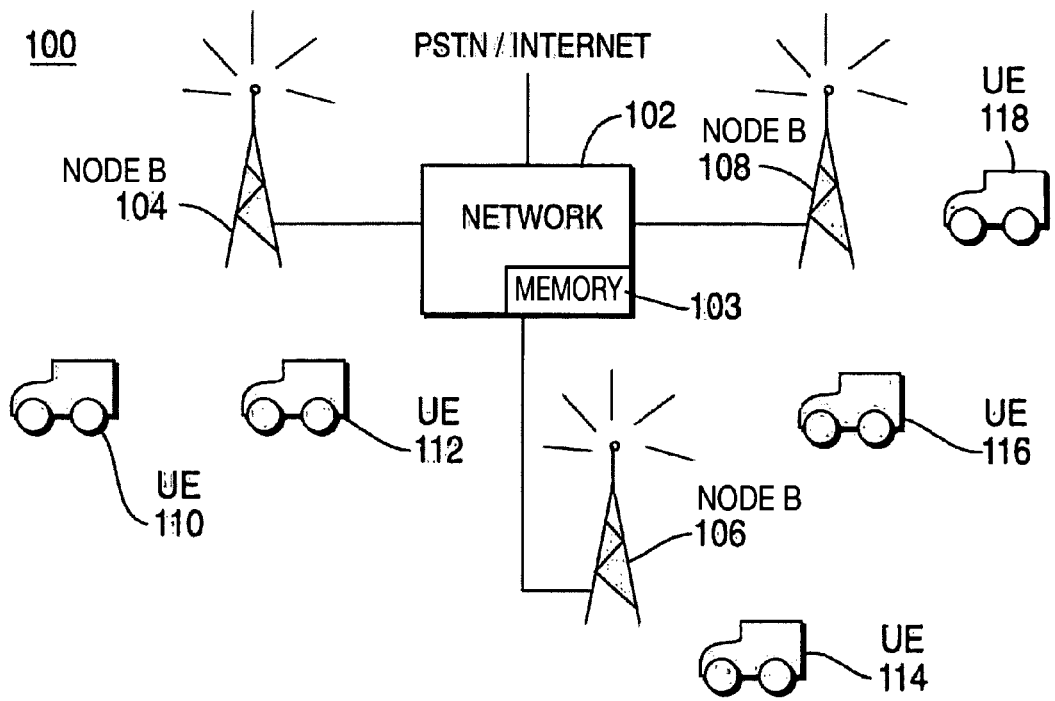
FIG. 5 shows a wireless communication system configured in accordance with the present invention.

FIG. 5 shows a wireless communication system 100 configured in accordance with the present invention. The wireless communication system 100 comprises a network 102 having memory 103. The network 102 is associated with one or more Node Bs 104, 106, 108 or base stations (hereafter referred to as "Node Bs") and is in communication with a plurality of UEs 110, 112, 114, 116, 118. The UEs 110 -118 may be associated with the network 102, or may be associated with another network and can roam from one network to another.

As will be explained in detail hereinafter, the network 102 maintains in memory 103 information regarding each of the UEs, the services and/or groups with which each UE is associated, and the paging windows each UE will access. Although the foregoing description will present the information in memory 103 as being a plurality of tables, this description is presented for convenience only. One skilled in the art would clearly realize that a plurality of tables may be utilized, or a single table having many different columns may be utilized in accordance with the present invention. The description regarding one or more tables is not intended to limit the present invention to requiring multiple tables. Referring to Table 2, the network 102 maintains in memory 103 a table having a group list comprising a listing of each group identifier and all of the members associated with each group identifier. The memory is accessible to the system administrator. This permits the system administrator to call up the group list and edit it when appropriate. When the group is edited, for example by adding or deleting a member UE, the affected UE is then informed as to its addition or deletion from the group as appropriate.

TABLE 2

| GROUP | GROUP ID | MEMBER UEs |
|---|---|---|
| ABC | $ID_{ABC}$ | UE22, UE24, UE26 |
| DEF | $ID_{DEF}$ | UE22, UE34, UE36 |
| GHI | $ID_{GHI}$ | UE22, UE34, UE46 |

Referring to Table 3, the network 102 also maintains in memory 103 a data file comprising a list of all of the groups to which each UE belongs. This allows the network 102 to schedule transmissions for a given UE such that it can indeed handle more than one possible source of message for it. For example, as will be described in greater detail hereinafter, if a UE is scheduled to receive a data message at time X on channel A, the UE may not be able to simultaneously also receive a different message overlapping with time X, but on a different channel.

TABLE 3

| UEs | ASSOCIATED GROUPS |
|---|---|
| 22 | ABC, DEF, GHI |
| 24 | ABC |
| 26 | ABC |

TABLE 3-continued

| UEs | ASSOCIATED GROUPS |
|---|---|
| 34 | DEF, GHI |
| 36 | DEF |
| 46 | GHI |

The network 102, having the information from Tables 2 and 3, must then determine the most efficient manner for scheduling the group identifiers. It should be recognized that in order to save airtime, the "shortest" amount of airtime should be utilized. Since the data message is assumed to be many orders of magnitudes longer than the group identifiers with associated pointers, it is paramount to limit the number of times that messages are sent. In fact, it is assumed that the data message is only sent once unless the UE experiences a scheduling conflict whereby a data message may have to be re-transmitted or scheduled for more than one occurrence.

A second scheduling factor is to attempt to transmit all of the group identifiers and associated pointers for a particular UE within a single paging window. Since the group identifier and associated pointers are assumed to be minimal in length, it is preferable to repeat the group identifiers and associated pointers in multiple paging windows as necessary in order to limit the number of paging windows each UE must access, and therefore limit the number of waking periods for each UE.

Accordingly, referring to Table 4, the network maintains in memory 103 a listing of paging windows and the group identifiers that will be transmitted within each window. This table is derived from the information in Tables 2 and 3 which show the group, group identifier, the member UEs associated with each group and the groups associated with each UE. In essence, Table 4 sets forth the scheduling parameters for each paging window. As shown, each member UE is associated with a single paging window within which multiple group identifiers will be transmitted. Although shown in Table 4 as associated with paging window L, UE36 and UE46 may be associated with either paging window K or paging window L since UE36 needs only group identifier $ID_{DEF}$ to be received and UE46 needs only $ID_{GHI}$ to be received. Paging window K or L would be sufficient to provide an adequate message and pointer for both UE36 and UE46.

TABLE 4

| PAGING WINDOW | GROUP ID | MEMBER UEs |
|---|---|---|
| K | $ID_{ABC}, ID_{DEF}, ID_{GHI}$ | UE22, UE24, UE26 |
| L | $ID_{DEF}, ID_{GHI}$ | UE34, UE36, UE46 |

Figure 6:
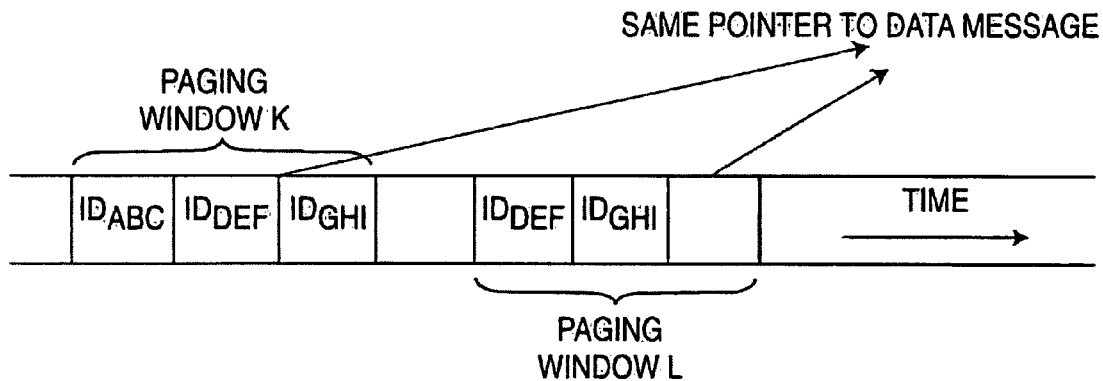
FIG. 6 is a signal diagram of multiple paging windows, each paging window having a plurality of identifiers in accordance with the present invention.

Referring to FIG. 6, the group identifiers are added to the appropriate paging windows. As shown, the group identifiers are repeated as necessary. The network 102 then notifies each UE which paging window to look to for its group identifier. The UE then looks to this paging window (or windows) for its group identifiers. Accordingly, each UE need only look within its assigned paging window for its identifiers. This method permits each UE to only search a single paging window, or a vastly reduced set of paging windows as opposed to the prior art methods.

As shown in FIG. 6, the UEs look in the appropriate paging window to search for its group identifiers. Each group identifier, as mentioned, includes a pointer which directs the UE to the location or address of a subsequent data message. Depending on the wireless network being utilized the pointer may indicate time, frequency channel, coding (eg. CDMA), and/or direction, (often called space encoding), as appropriate for the RF modulation scheme employed. In fact, the pointer may "point" from one RF network to another RF Network. For instance, the pointer may be delivered via GSM, but the actual data may arrive via a Wireless LAN, for UEs so equipped. The data message itself is scheduled to occur after the last pointer transmission occurs, in order to guarantee that all the member UEs have the pointer to the data and will be able to assume a state suitable to acquire the data prior to its actual transmission. The approach shown in FIG. 6 is efficient with respect to air-time, if the one instance of the data message is relatively long compared to the multiple instances of the group identifiers and associated pointers to the data.

Even in the event that scheduling of the UEs to certain paging windows is so complicated as to require a UE to search more than one paging window, the present invention still has several significant advantages over the prior art. First, if the UE searches multiple paging windows, it can avoid redundant receptions of the same data message by comparing the multiple pointers. Redundant pointers will be discarded. For each repeating cycle, there can only be one unique message per instance of the pointer.

Second, although a UE may be forced to search multiple paging windows, the number of paging windows will be significantly reduced over that required by the prior art. Accordingly, the number of waking periods will be reduced and the expected UE battery life will be significantly increased.

For example, the three group identifiers $ID_{ABC}$, $ID_{DEF}$, $ID_{GHI}$ will be present in paging window K, which is now the only window UE22 needs to search. These identifiers may be repeated in one or more other paging windows, because the other members of the group only search those windows. All occurrences of the group identifications, however, point (by way of their associated pointer) to one unique instance of the actual data message. Although there is an increase in airtime usage because the group identifications are repeated, this increase is assumed to be insignificant compared to what would be required to repeat the data message. UE22 needs to awaken for only one paging window, so it saves significant battery life versus the scheme set forth in Table 1.

Figure 7:
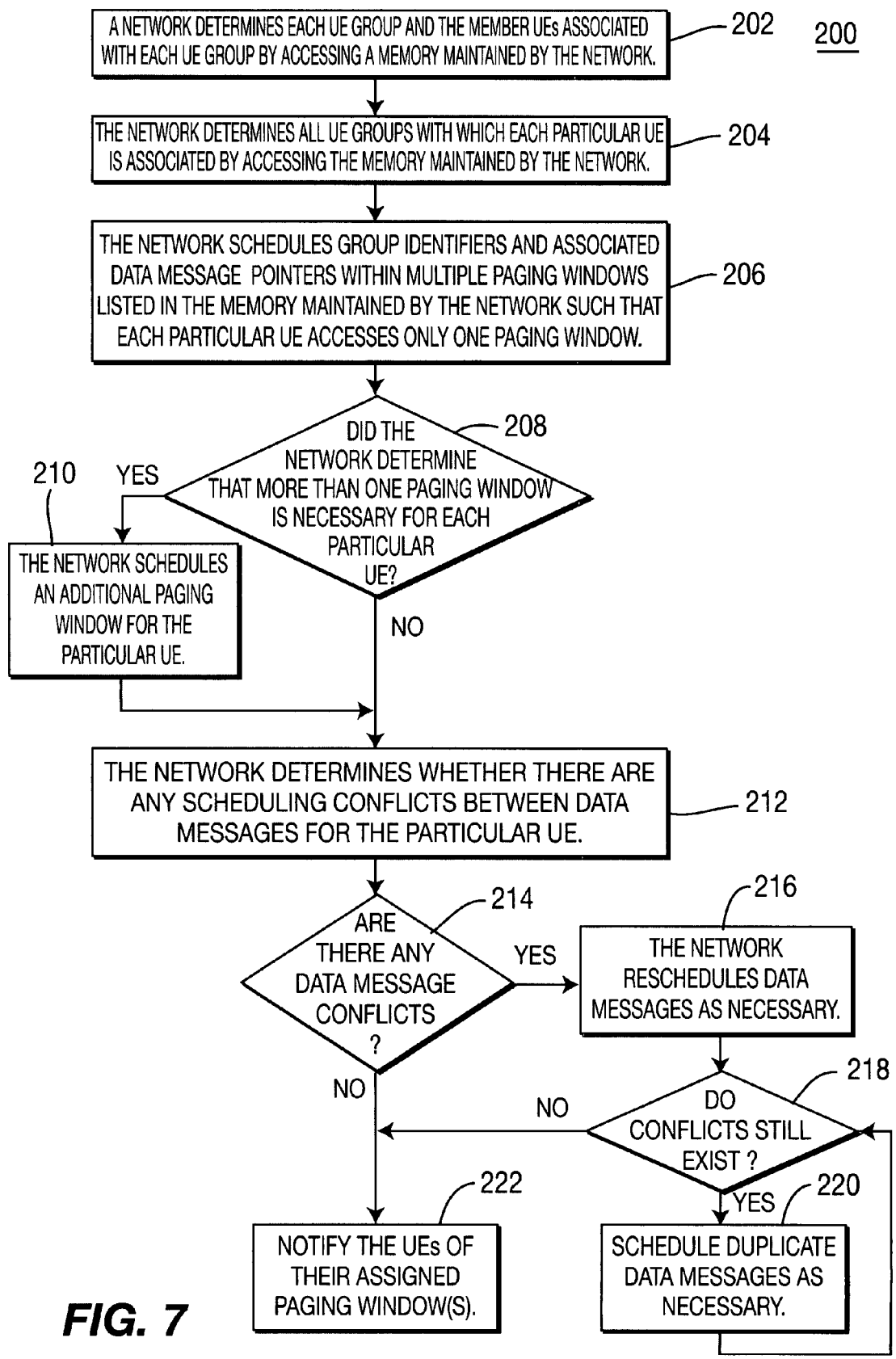
FIG. 7 is a flow diagram of a wireless communication method implemented in the system of FIG. 5.

FIG. 7 is a flow diagram of a wireless communication method 200 implemented in the wireless communication system 100 of FIG. 5 in accordance with the present invention is shown. In step 202, the network 102 determines each UE group and the member UEs 110, 112, 114, 116 and 118 associated with each UE group by accessing a memory 103 maintained by the network 102. As a result of the determination made in step 202, the network 102 determines all groups with which each particular UE is associated by accessing the memory 103 maintained by the network 102 (step 204). It should be noted that steps 202 and 204 are essentially different views of the same information and may comprise a single step. The network 102 then schedules group identifiers and associated data message pointers within multiple paging windows listed in the memory 103 maintained by the network 102 such that each particular UE 110, 112, 114, 116 and 118 accesses only one paging window (step 206). The network then determines if more than one paging window is necessary for each particular UE (step 208). If so, the network 102 schedules an additional paging window for that particular UE (step 210) and then continues on with step 212. If, in step 208, the network 102 determines that more than one paging window is not necessary, the network 102 determines whether there are any scheduling conflicts between data messages for the particular UE (step 212). If the network 102 determines that there are data message conflicts (step 214), the network 102 reschedules data messages as necessary (step 216). The network 102 then determines if data message conflicts still exist (step 218). If so, duplicate data messages are scheduled as necessary (step 220). Step 218 is then repeated as necessary in order to resolve data message scheduling conflicts. Once it has been determined that no further conflicts exist (step 218), the UEs are notified of their assigned paging window(s) (step 222).

While the foregoing description represents a time line with a single physical carrier channel as an example, there can be multiple physical channels. For example, the paging information may exist on the same or a different physical channel from the data channel. Likewise, the invention is not intended to be limited to 3G cellular systems, even though 3G cellular systems have been referenced as an example. All such and other variations are envisaged to be within the purview and scope of the invention.

What is claimed is:

1. A method for enabling multicast services comprising:
   maintaining lists of user equipment (UE) group identifiers, and member UEs associated with the UE group identifiers, wherein paging windows define time periods during which member UEs in particular UE groups are powered up to access UE group identifiers and associated data messages pointers;
   scheduling UE group identifiers and associated data message pointers within multiple paging windows such that each UE accesses only one paging window;
   determining whether more than one paging window is necessary for each particular UE; and
   determining whether there are any scheduling conflicts between data messages for a particular UE, wherein data messages are rescheduled when scheduling conflicts are determined such that duplicate messages are scheduled if necessary to remove the scheduling conflict.

2. The method of claim 1 further comprising:
   scheduling additional paging window for each particular UE determined to require more than one paging window.

3. The method of claim 1 further comprising:
   notifying the UEs of their assigned paging windows when there are no data message scheduling conflicts.

4. The method of claim 1 wherein maintaining lists includes maintaining a first table in the memory having a UE group list of each UE group identifier and all of the member UEs associated with each group identifier.

5. The method of claim 4 wherein maintaining lists further includes maintaining a second table in the memory having a list of all of the UE groups to which each UE belongs.

6. The method of claim 5 wherein maintaining lists further includes maintaining a third table in the memory having a list of paging windows and the group identifiers that are to be transmitted within each window.

7. A network controller configured to efficiently manage paging windows and data messages comprising:
   a memory configured to maintain lists of user equipment (UE) group identifiers, and UE members associated with the UE group identifiers, wherein paging windows define time periods during which UEs in particular UE groups are powered up to access UE group identifiers and associated data messages pointers;
   a scheduler configured to schedule UE group identifiers and associated data message pointers within multiple paging windows such that each UE accesses only one paging window, and determine whether more than one paging window is necessary for each particular UE, and whether there are any scheduling conflicts between data messages for a particular UE, wherein data messages are rescheduled when scheduling conflicts are determined such that duplicate messages are scheduled if necessary to remove the scheduling conflict.

8. The network controller of claim 7 wherein the scheduler is configured to schedule an additional paging window for each particular UE determined to require more than one paging window.

9. The network controller of claim 7 further comprising a transmitter configured to notify the UEs of their assigned paging windows when there are no data message scheduling conflicts.

10. The network controller of claim 7 wherein the memory maintains a first table in the memory having a UE group list of each UE group identifier and all of the member UEs associated with each group identifier.

11. The network controller of claim 10 wherein the memory further maintains a second table in the memory having a list of all of the UE groups to which each UE belongs.

12. The network controller of claim 11 wherein the memory further maintains a third table in the memory having a list of paging windows and the group identifiers that are to be transmitted within each window.

* * * * *